US008573837B2

(12) United States Patent  (10) Patent No.: US 8,573,837 B2
Matsudo et al.  (45) Date of Patent: Nov. 5, 2013

(54) TEMPERATURE MEASURING APPARATUS AND TEMPERATURE MEASURING METHOD

(75) Inventors: Tatsuo Matsudo, Nirasaki (JP); Chishio Koshimizu, Nirasaki (JP)

(73) Assignee: Tokyo Electron Limited (JP)

( * ) Notice: Subject to any disclaimer, the term of this patent is extended or adjusted under 35 U.S.C. 154(b) by 103 days.

(21) Appl. No.: 13/428,198

(22) Filed: Mar. 23, 2012

(65) Prior Publication Data

US 2012/0243572 A1  Sep. 27, 2012

Related U.S. Application Data

(60) Provisional application No. 61/472,685, filed on Apr. 7, 2011.

(30) Foreign Application Priority Data

Mar. 23, 2011 (JP) ................................ 2011-064462

(51) Int. Cl.
 *G01K 11/00* (2006.01)
 *B32B 3/00* (2006.01)
(52) U.S. Cl.
 USPC .............................. 374/161; 374/159; 428/58
(58) Field of Classification Search
 USPC ..................................... 374/161, 159; 428/58
 See application file for complete search history.

(56) References Cited

U.S. PATENT DOCUMENTS

| 2012/0073781 A1* | 3/2012 | Yamawaku et al. | 165/11.1 |
| 2012/0207189 A1* | 8/2012 | Abe et al. | 374/161 |
| 2012/0224603 A1* | 9/2012 | Abe et al. | 374/129 |
| 2012/0243573 A1* | 9/2012 | Matsudo | 374/161 |

FOREIGN PATENT DOCUMENTS

| JP | 2006-112826 | | 4/2006 |
| JP | 2006112826 A | * | 4/2006 |
| JP | 2008-216182 | | 9/2008 |
| JP | 2008216182 A | * | 9/2008 |

* cited by examiner

*Primary Examiner* — Lisa Caputo
*Assistant Examiner* — Jamel Williams
(74) *Attorney, Agent, or Firm* — Cantor Colburn LLP

(57) ABSTRACT

A temperature measuring apparatus and a temperature measuring method that may simultaneously measure temperatures of objects in processing chambers. The temperature measuring apparatus includes a first light separating unit which divides light from the light source into measurement lights; second light separating units which divide the measurement lights from the first light separating unit into measurement lights and reference lights; third light separating units which further divide the measurement lights into first to n-th measurement lights; a reference light reflecting unit which reflects the reference lights; an light path length changing unit which changes light path lengths of the reference lights reflected by the reference light reflecting unit; and photodetectors which measure interference between the first to n-th measurement lights reflected by the objects to be measured and the reference lights reflected by the reference light reflecting unit.

6 Claims, 8 Drawing Sheets

TEMPERATURE MEASURING APPARATUS AND TEMPERATURE MEASURING METHOD

CROSS-REFERENCE TO RELATED PATENT APPLICATIONS

This application claims the benefit of Japanese Patent Application No. 2011-64462, filed on Mar. 23, 2011, in the Japanese Patent Office, and U.S. Patent Application No. 61/472,685 filed on Apr. 7, 2011 in the U.S. Patent and Trademark Office, the disclosure of which are incorporated herein in their entirety by reference.

BACKGROUND OF THE INVENTION

1. Field of the Invention

The present invention relates to a temperature measuring apparatus and a temperature measuring method.

2. Description of the Related Art

Accurately measuring a temperature of a substrate, for example, a semiconductor wafer or a liquid crystal display (LCD) substrate, to be processed by using a plasma processing apparatus is very important in order to accurately control shapes, properties, and so on of films or holes formed on or in the semiconductor wafer or the LCD substrate based on the result of various processes such as film formation and etching. Accordingly, a temperature of a semiconductor wafer or a LCD substrate has been measured by using various conventional methods such as a temperature measuring method using a fluorescent thermometer for measuring a temperature of a rear surface of a substrate, a resistance thermometer, or the like.

Recently, a temperature measuring technology using a low-coherence interferometer which can directly measure a temperature of a substrate, which is difficult to do with the conventional temperature measuring methods, has been developed. Also, as the temperature measuring technology using the low-coherence interferometer, a technology has been suggested in which a light from a light source is divided into a measurement light for temperature measurement and a reference light by a first splitter, the measurement light is divided into n measurement lights by a second splitter, the n measurement lights are emitted to n measurement points, and interference between reflected lights of the n measurement lights and a reflected light of the reference light reflected by a reference light reflecting unit is measured to simultaneously measure temperatures of the plurality of measurement points (refer to, for example, Patent Reference 1). According to such a technology, temperatures of a plurality of measurement points may be simultaneously measured with a simple structure. Also, a temperature measuring technology using a low-coherence interferometer, which can convert measurement lights by a multiplexer and supply the converted measurement lights to a plurality of processing chambers to measure temperatures of substrates or the like inside the processing chambers, has been developed (refer to, for example, Patent Reference 2).

In the temperature measuring technology in which the measurement lights are converted by the multiplexer and supplied to the plurality of processing chambers to measure the temperatures of the substrates or the like inside the processing chambers, since the measurement lights are converted by the multiplexer and supplied to the plurality of processing chambers, the temperatures of the substrates or the like inside the processing chambers cannot be simultaneously measured.

[Patent Reference 1] Japanese Laid-Open Patent Publication No. 2006-112826
[Patent Reference 2] Japanese Laid-Open Patent Publication No. 2008-216182

SUMMARY OF THE INVENTION

The present invention provides a temperature measuring apparatus and a temperature measuring method that may simultaneously measure temperatures of objects to be measured that are formed in a plurality of processing chambers.

According to an aspect of the present invention, a temperature measuring apparatus includes: a light source; a first light separating unit which divides light from the light source into a plurality of measurement lights; a plurality of second light separating units which divide the measurement lights from the first light separating unit into measurement lights and reference lights; a plurality of third light separating units which further divide the measurement lights from the second light separating units into first to n-th measurement lights, wherein the number of third light separating units is the same as the number of second light separating units; a reference light reflecting unit which reflects the reference lights from the second light separating units; a light path length changing unit which changes light path lengths of the reference lights reflected by the reference light reflecting unit; a plurality of reference light transmitting units which transmit the reference lights from the second light separating units to an emission position of the reference light reflecting unit, wherein the number of reference light transmitting units is the same as the number of second light separating units; first to n-th measurement light transmitting units which transmit the first to n-th measurement lights from the third light separating units to measurement light emission positions of measurement points of objects to be measured; and a plurality of photodetectors which measure interference between the first to n-th measurement lights reflected by the objects to be measured and the reference lights reflected by the reference light reflecting unit, wherein the number of photodetectors is the same as the number of second light separating units, wherein the light path lengths of the first to n-th measurement lights between the third light separating units and the objects to be measured are differently set, and light path lengths of the reference lights reflected by the reference light reflecting unit are changed by the single light path length changing unit.

According to another aspect of the present invention, a temperature measuring method for measuring temperatures of objects to be measured by using a temperature measuring apparatus includes: a light source; a first light separating unit which divides light from the light source into a plurality of measurement lights; a plurality of second light separating units which divide the measurement lights from the first light separating unit into measurement lights and reference lights; a plurality of third light separating units which further divide the measurement lights from the second light separating units into first to n-th measurement lights, wherein the number of third light separating units is the same as the number of second light separating units; a reference light reflecting unit which reflects the reference lights from the second light separating units; an light path length changing unit which changes light path lengths of the reference lights reflected by the reference light reflecting unit; a plurality of reference light transmitting units which transmit the reference lights from the second light separating units to an emission position of the reference light reflecting unit, wherein the number of reference light transmitting units is the same as the number of second light separating units; first to n-th measurement light transmitting units which transmit the first to n-th measurement lights from the third light separating units to measurement light emission positions of measurement points of objects to be measured; and a plurality of photodetectors which measure interference between the first to n-th measurement lights reflected by the objects to be measured and the reference lights reflected by the reference light reflecting unit, wherein the number of photodetectors is the same as the number of second light separating units, wherein the light path lengths of the first to n-th measurement lights between the third light separating units and the objects to be measured are differently set, and light path lengths of the reference lights reflected by the reference light reflecting unit are changed by the single light path length changing unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
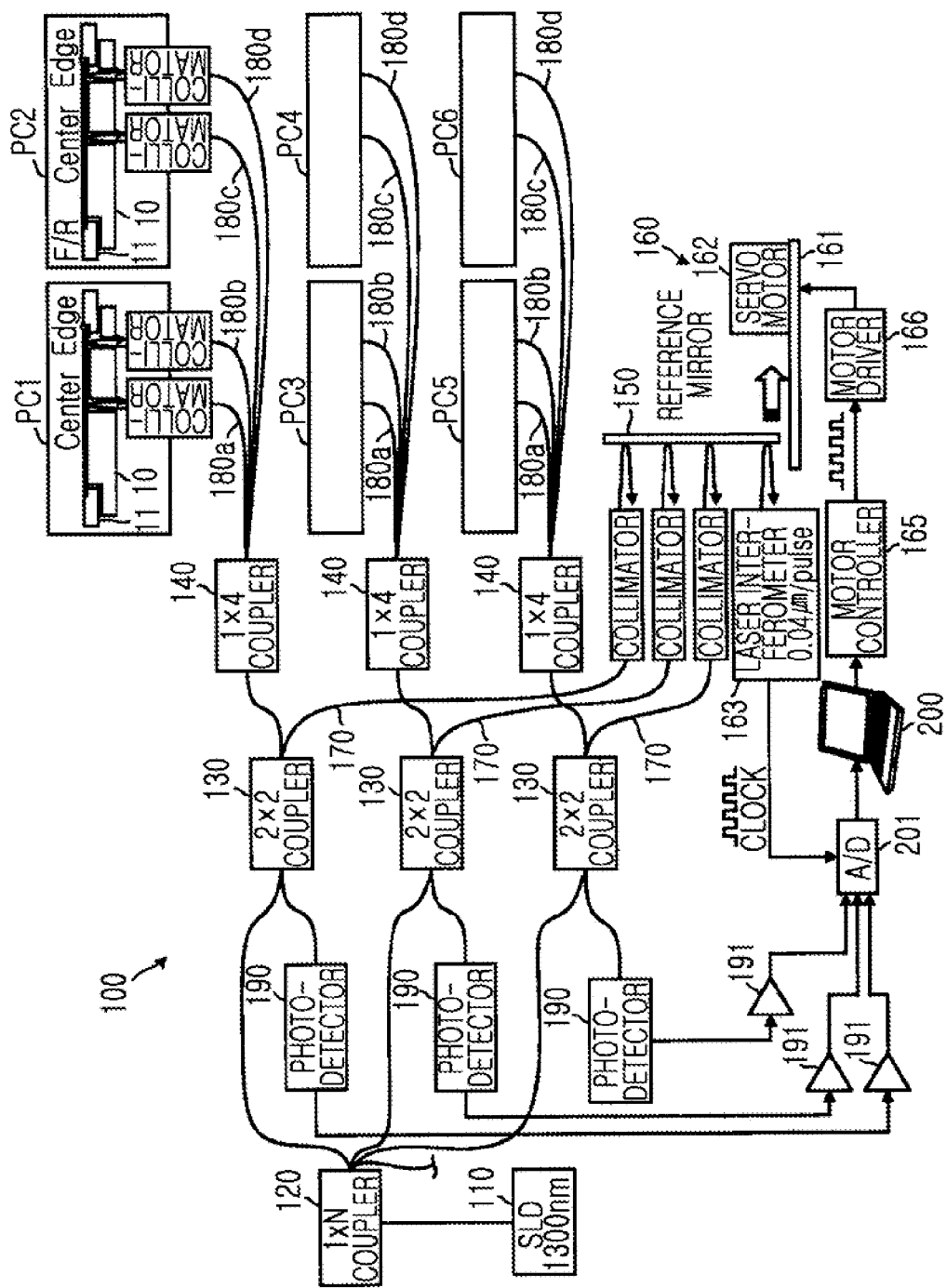
FIG. 1 is a schematic view of a temperature measuring apparatus according to an embodiment of the present invention.

The present invention will now be described more fully with reference to the accompanying drawings, in which exemplary embodiments of the invention are shown. Also, in the specification and drawings, components having substantially the same functions are denoted by the same reference numerals, and a repeated explanation thereof will not be given.

FIG. 1 is a schematic view of a temperature measuring apparatus according to an embodiment of the present invention. In FIG. 1, PC1 to PC6 denote processing chambers of a plasma etching apparatus. Also, in FIG. 1, although processing chambers PC3 to PC6 are simply shown, as compared with the processing chambers PC1 and PC2, for convenience of space, the processing chambers PC3 to PC6 have the same structures as the processing chambers PC1 and PC2. In the current embodiment, the temperature measuring apparatus 100 has a structure in which temperatures of central portions and peripheral portions of semiconductor wafers W mounted on holding stages 10 in the processing chambers PC1 to PC6 are measured from rear surfaces of the semiconductor wafers W. In other words, in the current embodiment, an object to be measured is the semiconductor wafer W. Also, the temperature measuring apparatus 100 may be formed to measure, for example, a temperature of a focus ring 11 shown in FIG. 1 in addition to the temperatures of the semiconductor wafers W.

The temperature measuring apparatus 100 includes a light source 110, a first light separating unit 120 for dividing light from the light source 110 into a plurality of (N) measurement lights, a plurality of second light separating units 130 (in the current embodiment, three second light separating units 130) for dividing the plurality of measurement lights from the first light separating unit 120 into measurement lights and reference lights, and a plurality of third light separating units 140 (in the current embodiment, three third light separating units 140), which has the same number as the second light separating unit 130, for additionally dividing the measurement lights from the second light separating units 130 into n measurement lights (in the current embodiment, n is 4, that is, first to fourth measurement lights).

Also, the temperature measuring apparatus 100 includes a reference light reflecting unit 150 for reflecting the reference lights from the second light separating units 130, an light path length changing unit 160 for changing light path lengths of the reference lights reflected by the reference light reflecting unit 150, a plurality of reference light transmitting units 170 (in the current embodiment, three reference light transmitting units 170), which has the same number as the second light separating unit 130, for transmitting the reference lights from the second light separating units 130 to an emission position of the reference light reflecting unit 150, first to fourth measurement light transmitting units 180a to 180d for transmitting the first to fourth measurement lights from the third light separating units 140 to measurement light emission positions of respective measurement points of the objects to be measured, and a plurality of photodetectors 190, which has the same number as the second light separating unit 130, for measuring interference between the first to fourth measurement lights reflected by the object to be measured and the reference lights reflected by the reference light reflecting unit 150.

Also, in the temperature measuring apparatus 100, the light path lengths of the first to fourth measurement lights between the third light separating units 140 and the semiconductor wafers W which are the objects to be measured are differently set. In addition, in the temperature measuring apparatus 100, one light path length changing unit 160 changes the light path lengths of three reference lights reflected by the reference light reflecting unit 150.

An arbitrary light capable of measuring interference between the measurement light and the reference light may be used as the light source 110. When a temperature of the semiconductor wafer W is measured, light in which reflected light from a distance (generally, from about 800 to about 1500 μm) between a front surface and a rear surface of the semiconductor wafer W does not cause interference may be used. Specifically, for example, a low-coherence light may be used. The low-coherence light refers to light having a short coherence length. A central wavelength of the low-coherence light may be in a range between about 0.3 and about 20 μm, and more preferably, between about 0.5 and about 5 μm. The coherence length may be in a range between about 0.1 and about 100 μm, and more preferably, equal to or less than 3 μm. By using the low-coherence light as the light source 110, an obstacle such as unnecessary interference may be avoided, and interference between the low-coherence light and the reference light based on reflected light from the front surface or an inner layer of the semiconductor wafer W may be easily measured.

As the light source 110 using the low-coherence light, for example, a super luminescent diode (SLD), a light-emitting diode (LED), a high-intensity lamp (a tungsten lamp, a xenon lamp, etc.), an ultra-wideband wavelength light source, or the like may be used. From among the low-coherence light sources, the high-intensity SLD (having a wavelength of, e.g., 1300 nm) shown in FIG. 1 may be used as the light source 110.

An optical fiber coupler may be used as the first light separating unit 120. However, the present invention is not limited thereto, and any light separating unit capable of dividing light into a plurality (n) of measurement lights may be used. Similarly, an optical fiber coupler may be used as the second light separating unit 130. However, the present invention is not limited thereto, and any light separating unit capable of dividing light into a reference light and a measurement light may be used. An optical fiber coupler may be used as the third light separating unit 140. However, the present invention is not limited thereto, and any light separating unit capable of dividing light into a plurality of measurement lights (in the current embodiment, four measurement lights) may be used. Alternatively, an optical waveguide duplexer, a translucent mirror, or the like may be used as the first light separating unit 120, the second light separating units 130, and the third light separating units 140.

The reference light reflecting unit 150 may be formed of, for example, a reference mirror. Examples of the reference mirror may include a corner cube prism, a plane mirror, and the like. In the current embodiment, three reference lights are reflected by one plane mirror.

The light path length changing unit 160 moves the reference light reflecting unit 150 in a direction parallel to an incident direction of the reference lights. As described above, in the current embodiment, three reference lights are reflected by the reference light reflecting unit 150 formed of one plane mirror, and the reference light reflecting unit 150 moves in a direction parallel to an incident direction of the reference lights by one light path length changing unit 160. As such, by driving the reference light reflecting unit 150 in one direction, the light path lengths of the reference lights reflected by the reference light reflecting unit 150 may be changed. The light path length changing unit 160 includes a linear stage 161, a servo motor 162, a laser interferometer 163, and the like. The servo motor 162 is controlled by a controller 200, such as a computer, via a motor controller 165 and a motor driver 166. Also, a signal applied from the laser interferometer 163 is converted into a digital signal in an analog/digital (A/D) converter 201 and is input into the controller 200.

The photodetector 190 may be formed of, for example, a photodiode, in consideration of its low cost and compact size. Specifically, the photodetector 190 may be formed of a photo detector (PD) using, for example, a Si photodiode, an InGaAs photodiode, a Ge photodiode, or the like. However, if interference between the measurement light from the object to be measured and the reference light from the reference light reflecting unit 150 may be measured, the present invention is not limited to the above-described photodiodes, and the photodetector 190 may be formed of, for example, an avalanche photodiode, a photomultiplier, or the like. A signal detected by the photodetector 190 is input into the A/D converter 201 via an amplifier 191, converted into a digital signal, and processed by the controller 200.

The reference lights from the second light separating units 130 are transmitted to a reference light emission position of the reference light reflecting unit 150 by the reference light transmitting units 170 (in the current embodiment, three reference light transmitting units 170), which has the same number as the second light separating unit 130. The reference light transmitting units 170 are formed of an optical fiber, a collimator, or the like.

The first to fourth measurement lights from the third light separating unit 140 are transmitted by the first to fourth measurement light transmitting unit 180a to 180d, respectively, to measurement light emission positions of the objects to be measured (in the current embodiment, the semiconductor wafers W). The first to fourth measurement light transmitting units 180a to 180d are formed of an optical fiber, a collimator, or the like.

In the temperature measuring apparatus 100, the light path lengths of the first to fourth measurement lights between the third light separating units 140 and the objects to be measured are differently set. Specifically, for example, when lengths of optical fibers of the first to fourth measurement light transmitting units 180a to 180d are the same, leading end surfaces of the collimators, i.e., the measurement light emission positions, are disposed to be out of alignment in a direction that is approximately parallel to a direction in which light is emitted from the objects to be measured. Furthermore, by changing the lengths of the optical fibers without displacing the leading end surfaces of the collimators, the light path lengths of the first to fourth measurement lights between the third light separating units 140 and the objects to be measured may be different from one another.

Also, a difference between the light path lengths of the first to fourth measurement lights between the third light separating units 140 and the objects to be measured may be set in such a way that interference waves between the first to fourth measurement lights measured at the measurement points and the reference lights do not overlap with one another. For example, when a low-coherence light source is used as the light source 110, if the difference between the light path lengths is at least equal to or more than a coherence length of the interference wave, the interference waves may be prevented from overlapping with one another. Also, the difference between the light path lengths may be determined in consideration of a thickness of the object to be measured, a variation in the thickness, a range of a temperature to be measured, a moving distance of the reference light reflecting unit 150, and the like. Specifically, in a silicon wafer having a thickness of, for example, about 0.7 mm, a moving distance of the reference light reflecting unit 150 in a temperature range between a room temperature and about 200° C. is about 0.04 mm, and thus if the difference between the light path lengths of the first to fourth measurement lights is set to be about 0.1 mm, the interference waves at the measurement points may not overlap with one another.

Accordingly, the interference waves at the measurement points where the first to fourth measurement lights are emitted may be simultaneously detected by scanning the reference light reflecting unit 150 only once. Also, in the current embodiment, the reference light reflecting unit 150 reflects three reference lights from the three second light separating units 130. Accordingly, temperature measurement in the six processing chambers (the processing chambers PC1 to PC6) using the three reference lights may be performed by scanning the reference light reflecting unit 150 only once. Thus, time spent on temperature measurement may be reduced as much as possible.

As described above, in the temperature measuring apparatus 100, light from the light source 110 is incident on the first light separating unit 120 and divided into a plurality of (three or more) measurement lights. The measurement lights are incident on the plurality of (in the current embodiment, three) second light separating units 130 and divided into the measurement light and the reference light. From among these, the measurement light is divided into the first to fourth measurement lights by the third light separating units 140, is emitted toward the measurement points of the semiconductor wafers W, which are objects to be measured, from the measurement light emission positions in the processing chambers PC1 to PC6, and is reflected by rear surfaces, boundary surfaces between layers, and front surfaces of the semiconductor wafers W.

Meanwhile, the reference light is reflected by the reference light reflecting unit 150. Reflected lights of the first to fourth measurement lights are incident on the second light separating units 130 via the third light separating units 140, and the reflected lights of the first to fourth measurement lights together with a reflected light of the reference light are detected by the photodetector 190.

Then, an interference waveform is obtained by scanning the reference light reflecting unit 150 by the light path length changing unit 160. Here, the above-described low-coherence light source is used as the light source 110. According to the low-coherence light source, since a coherence length of light from the light source 110 is short, strong interference generally occurs in a place of junction of an light path length of a measurement light and an light path length of a reference light, and interference is substantially decreased in places other than this place. Accordingly, by moving the reference light reflecting unit 150 to change the light path length of the reference light, the reference light and the measurement light reflected due to a difference in refractive index between the front surfaces, the rear surfaces, and each inner layer (if the inner layers are formed inside the objects to be measured) of the objects to be measured interfere with each other.

Figure 2:
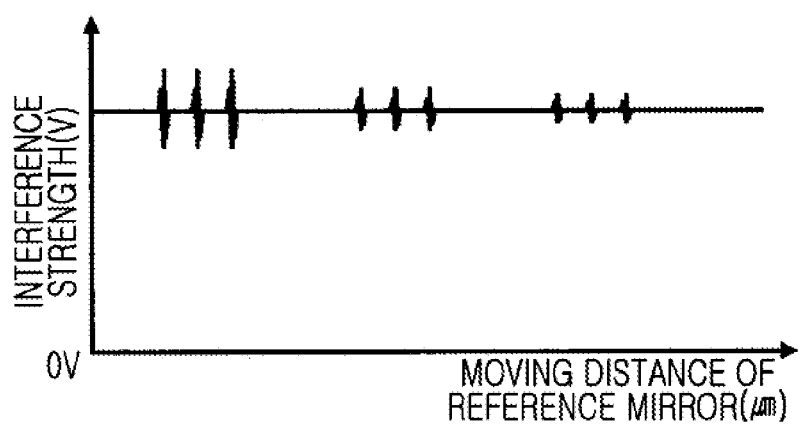
FIG. 2 is a graph showing an example of an interference waveform in the temperature measuring apparatus of FIG. 1.

An example of a waveform of the interference wave is shown in the graph of FIG. 2, wherein a vertical axis is an interference strength (V) and a horizontal axis is a moving distance (μm) of a reference mirror. As shown in FIG. 2, when a refractive index of the semiconductor wafer W is n and a thickness of the semiconductor wafer W is d, an interference wave of the measurement light reflected by the rear surface of the semiconductor wafer W and an interference wave of the measurement light reflected by the front surface of the semiconductor wafer W are detected at a position separated by a distance corresponding to nd. Also, since the light path lengths to the measurement points are differently set, peaks of the interference waves of the measurement points are detected at a position separated by a distance corresponding to a difference between the light path lengths.

When temperature measurement of the semiconductor wafer W is to be performed by using the temperature measuring apparatus 100, an initial thickness of the semiconductor wafer W, which is an object to be measured, is measured before the temperature measurement. At this time, a waveform of the interference wave as shown in FIG. 2 is obtained, and the initial thickness of the semiconductor wafer W is obtained as an interval of the peaks. A temperature of the semiconductor wafer W is detected by a variation in a thickness of the semiconductor wafer W with respect to the initial thickness, that is, a variation in the interval of the peaks.

Next, a method of measuring a temperature by using a variation in an light path length due to the temperature variation, based on the interference wave between the measurement light and the reference light will be described in detail.

If an object to be measured, e.g., the semiconductor wafer W, is heated through action of plasma or the like, the semiconductor wafer W expands, and at the same time, a refractive index thereof is changed, and thus positions of interference waveforms are displaced before and after the temperature variation of the semiconductor wafer W, thereby changing a distance between peaks of the interference waveforms. At this time, if a temperature variation occurs at measurement points, the positions of the interference waveforms are displaced at the measurement points, and thus a distance between peaks of the interference waveforms is changed. The temperature variation may be detected by measuring the distance between the peaks of the interference waveforms at the measurement points. For example, in the temperature measuring apparatus 100 shown in FIG. 1, the distance between the peaks of the interference waveforms corresponds to a moving distance of the reference light reflecting unit 150, and thus the temperature variation may be detected by measuring the moving distance of the reference light reflecting unit 150 corresponding to the distance between the peaks of the interference waveforms.

When a thickness of the semiconductor wafer W is d and a refractive index is n, displacement of a peak position with respect to the interference waveform depends on a linear expansion coefficient α that is unique to each layer with respect to the thickness d and mainly depends on a temperature coefficient β of a refractive index variation that is unique to each layer with respect to a variation of the refractive index n. Also, it is known that the displacement of a peak position with respect to the interference waveform depends on a wavelength with respect to the temperature coefficient β of the refractive index variation.

Accordingly, a thickness d' of the semiconductor wafer W at a measurement point P after the temperature variation is represented by Equation (1) below. Also, in Equation (1), ΔT denotes a temperature variation at the measurement point, α denotes a linear coefficient of expansion, and β denotes a temperature coefficient of a refractive index variation. Also, d and n denote a thickness and a refractive index of the semiconductor wafer W at the measurement point P before the temperature variation, respectively.

$$d' = d \cdot (1+\alpha \Delta T), n' = n \cdot (1+\beta \Delta T) \quad (1)$$

As shown in Equation (1), an light path length of a measurement light passing through the measurement point P is changed due to the temperature variation. The light path length is generally obtained by multiplying the thickness d by the refractive index n. Accordingly, when the light path length of the measurement light passing through the measurement point P before the temperature variation is L and the light path length after a temperature at the measurement point P is changed by ΔT is L', L and L' are represented by Equations (2) below.

$$L = d \cdot n, L' = d' \cdot n' \quad (2)$$

Accordingly, a difference (L'−L) between before and after the temperature variation of the light path length of the measurement light at the measurement point P that is calculated by Equations (1) and (2) and is represented by Equation (3) below. Also, in Equation (3) below, a minute term is omitted in consideration of α·β ≪ α and α·β ≪ β.

$$L'-L = d' \cdot n' - d \cdot n = d \cdot n \cdot (\alpha+\beta) \cdot \Delta T = L \cdot (\alpha+\beta) \cdot \Delta T_1 \quad (3)$$

In Equation (3), the light path length of the measurement light at each measurement point corresponds to a distance between peaks of interference waveforms between the measurement light and the reference light. Accordingly, if a linear coefficient of expansion α and a temperature coefficient β of a refractive index variation are previously searched, a temperature of each measurement point may be calculated by measuring a distance between the peaks of the interference waveforms between the measurement light and the reference light at each measurement point by using the Equation (3) above.

As such, when the temperature of each measurement point is calculated by using the distance between the peaks of the interference waveforms, the light path length shown between the peaks of the interference waveforms is changed due to the linear coefficient of expansion α and the temperature coefficient β of the refractive index variation, and thus there is a need to previously search the linear coefficient of expansion α and the temperature coefficient β of the refractive index variation. In general, a linear coefficient of expansion α and a temperature coefficient β of a refractive index variation of a material including the semiconductor wafer W depend on a temperature according to a temperature zone. For example, in general, when the material is in a temperature range between about 0 and about 100° C., the linear coefficient of expansion α is not much changed, and thus the linear coefficient of expansion α may be regarded as being constant. However, a variation in the linear coefficient of expansion α according to a material may be increased as a temperature increases at a temperature equal to or higher than 100° C., and thus in this case, a temperature dependency may not be ignored. Similarly, regarding the temperature coefficient β of the refractive index variation, a temperature dependency may not be ignored according to a temperature range.

For example, in the case of silicon (Si) constituting the semiconductor wafer W, it is known that the linear coefficient of expansion α and the temperature coefficient β of the refractive index variation approximates to each other, for example, in a secondary curved line in a temperature range between 0 and 500° C. As such, the linear coefficient of expansion α and the temperature coefficient β of the refractive index variation depend on a temperature, and thus if the linear coefficient of expansion α and the temperature coefficient β of the refractive index variation are previously searched and a temperature is calculated based on a result of the searching, a more accurate temperature may be calculated.

Figure 3:
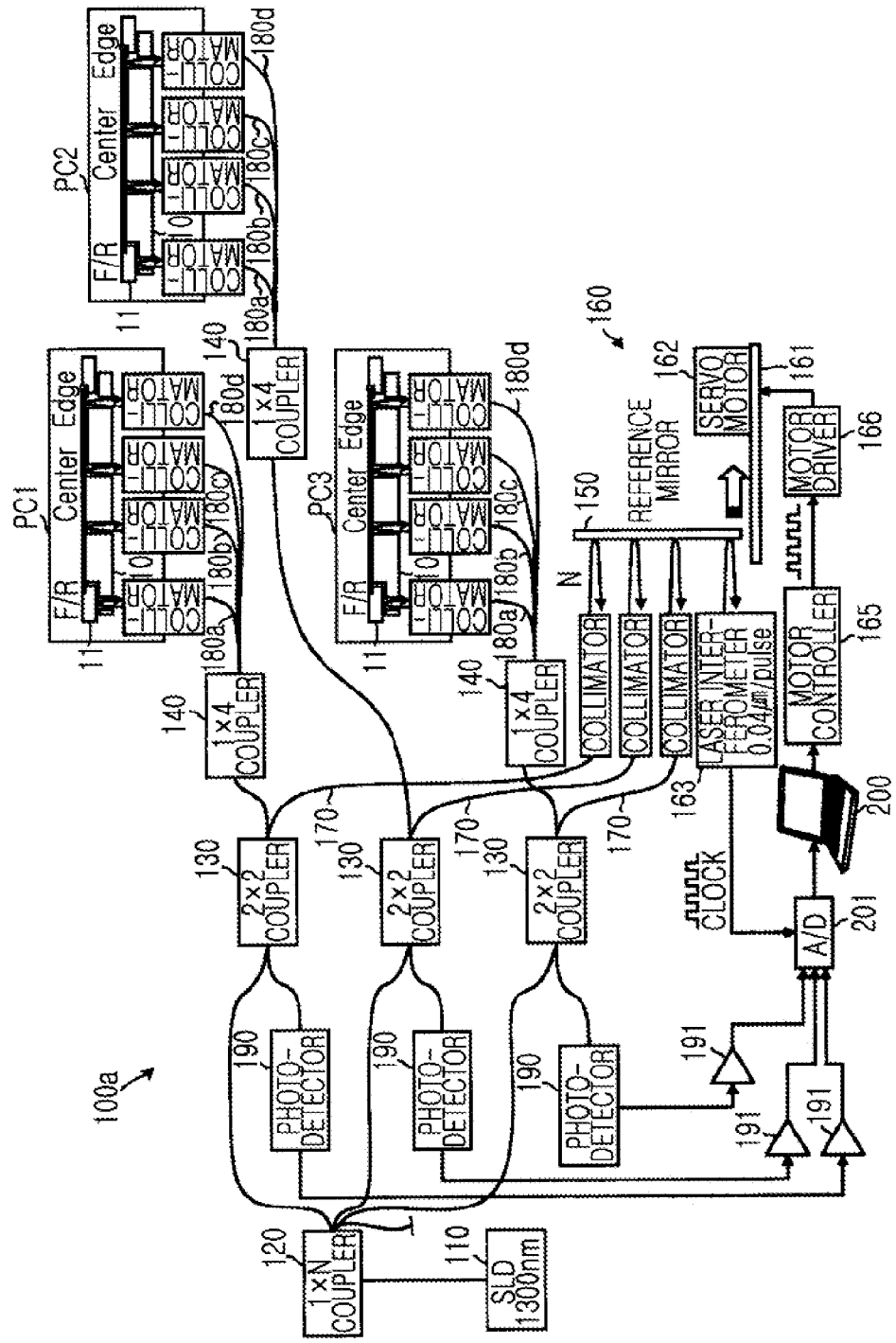
FIG. 3 is a schematic view of a temperature measuring apparatus according to another embodiment of the present invention.

Next, another embodiment of the present invention will be described. FIG. 3 is a schematic view of a temperature measuring apparatus 100a according to another embodiment of the present invention. The temperature measuring apparatus 100a shown in FIG. 3 measures temperatures at four points with respect to three processing chambers PC1 to PC3. The temperature measuring apparatus 100a emits first to fourth measurement lights divided by the third light separating units 140 onto three points of the semiconductor wafer W in the processing chamber PC1 to PC3 and one point of the focus ring 11 to measure temperatures of the points.

Figure 4:
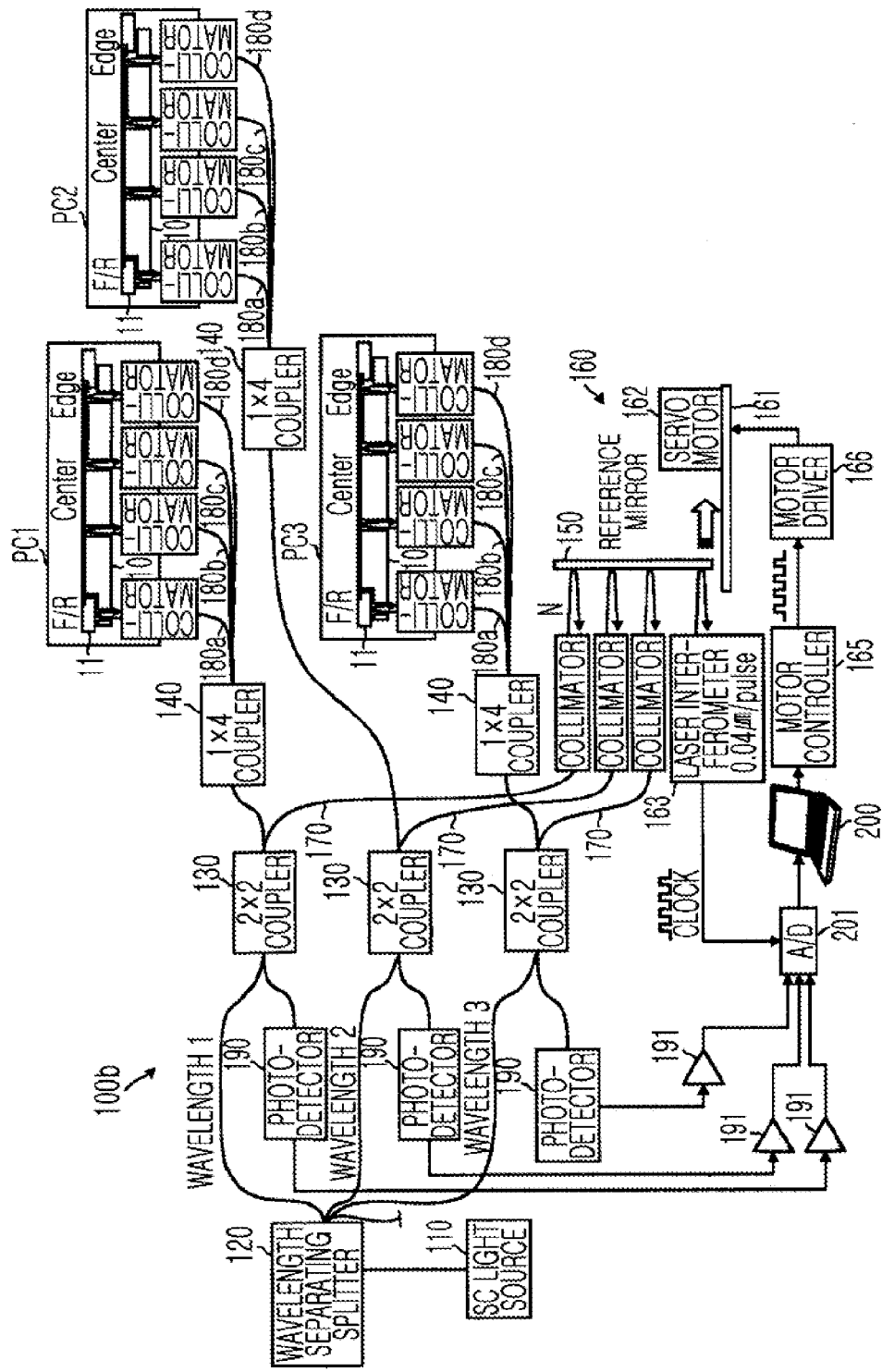
FIG. 4 is a schematic view of a temperature measuring apparatus according to another embodiment of the present invention.

FIG. 4 is a schematic view of a temperature measuring apparatus 100b according to another embodiment of the present invention. In the temperature measuring apparatus 100b of FIG. 4, a light source having a continuous wavelength, such as a supercontinuum (SC) light source, instead of a single wavelength, is used as the light source 110, and a wavelength separating splitter or the like may be used as the first light separating unit 120. The wavelength separating splitter divides light into three measurement lights having different wavelengths, and temperatures of the processing chambers PC1 to PC3 are measured with the measurement lights having different wavelengths.

Figure 5:
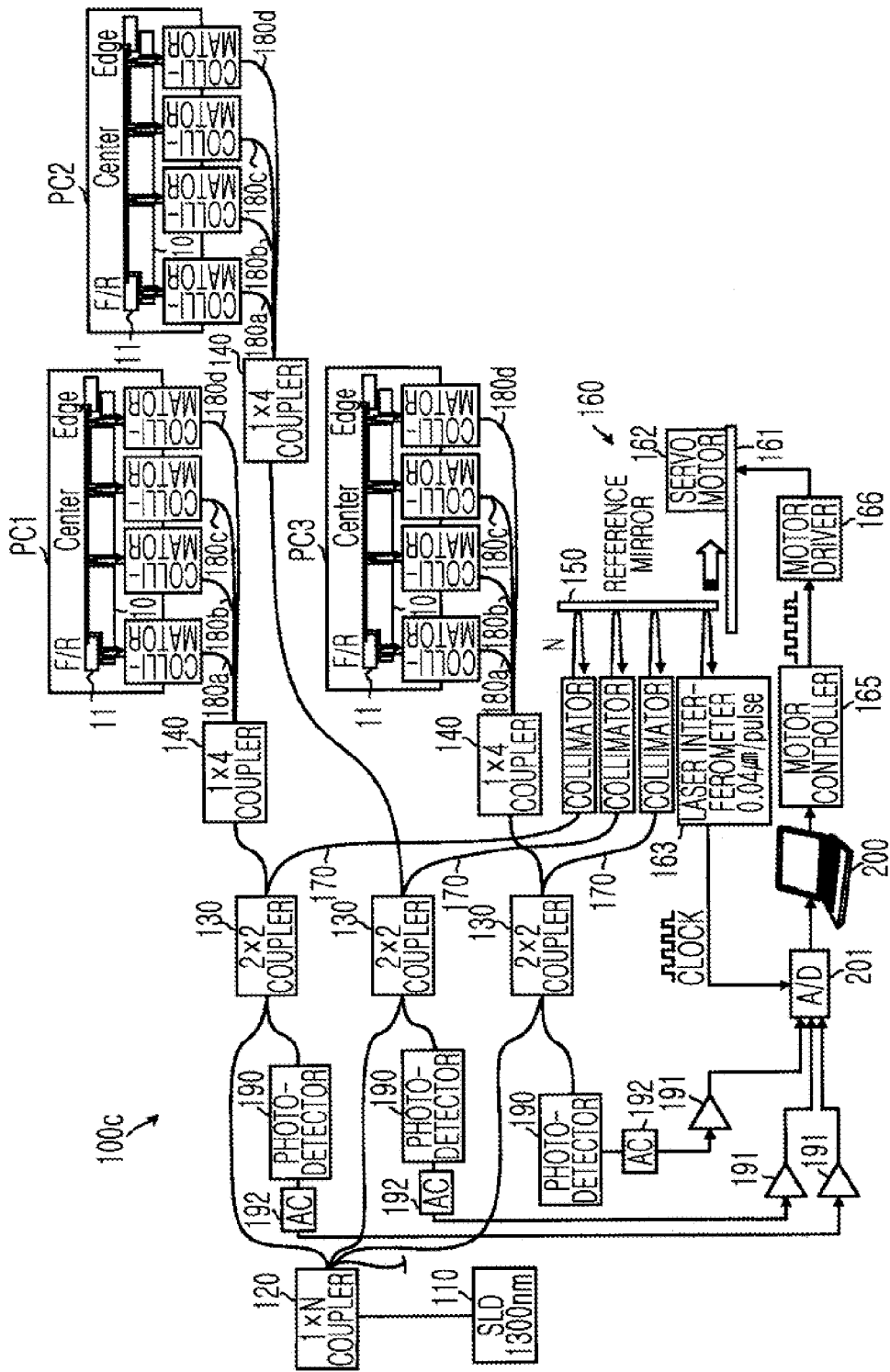
FIG. 5 is a schematic view of a temperature measuring apparatus according to another embodiment of the present invention.
Figure 6:
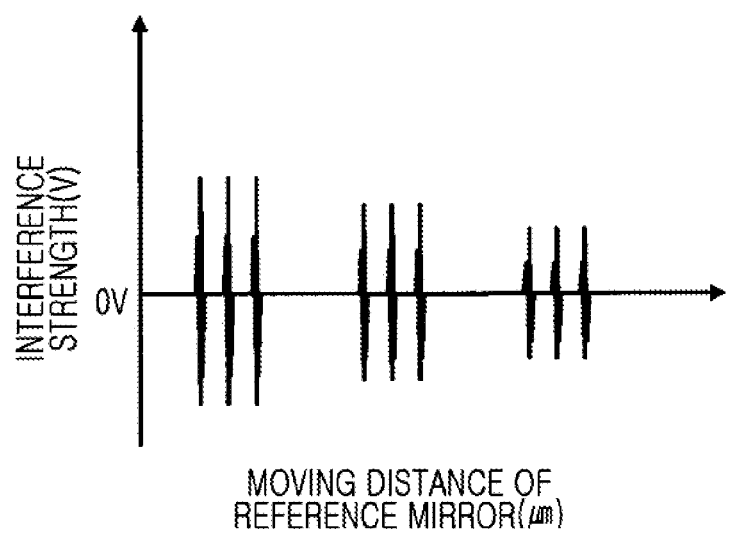
FIG. 6 is a graph showing an example of an interference waveform in the temperature measuring apparatus of FIG. 5.

FIG. 5 is a schematic view of a temperature measuring apparatus 100c according to another embodiment of the present invention. In the temperature measuring apparatus 100c of FIG. 5, an AC (alternating current) component extracting unit 192 for extracting an AC component from an output signal of the photodetector 190 is formed between the photodetector 190 and the amplifier 191. As such, referring to FIG. 6, by forming the AC component extracting unit 192, effects of a DC (direct current) component included in a measurement signal may be excluded as shown in waveforms of the graph of FIG. 6 (wherein a vertical axis is an interference strength (V) and a horizontal axis is a moving distance (μm) of reference mirror), and thus, temperature measurement may be performed with higher precision.

Figure 7:
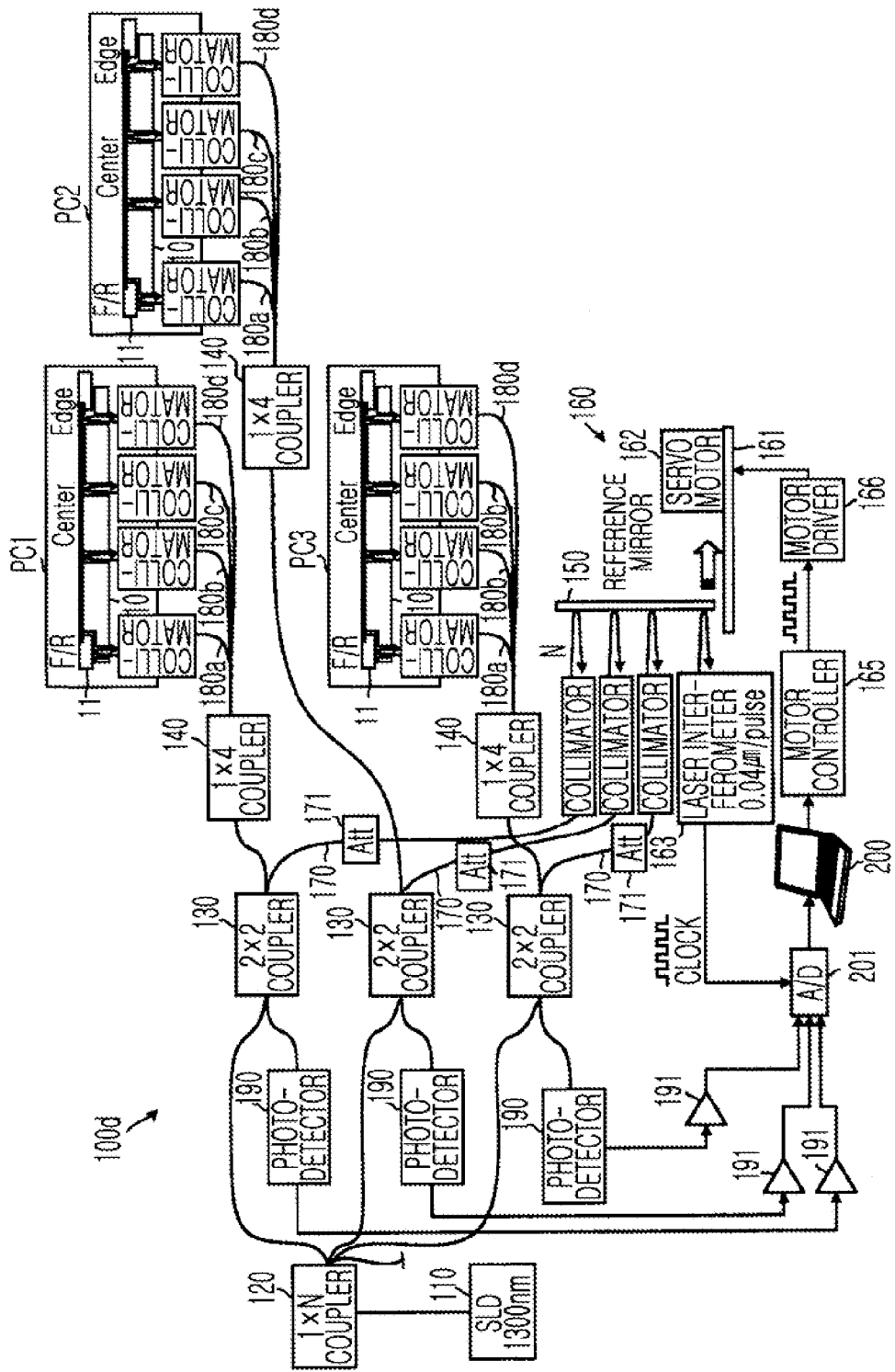
FIG. 7 is a schematic view of a temperature measuring apparatus according to another embodiment of the present invention.
Figure 8:
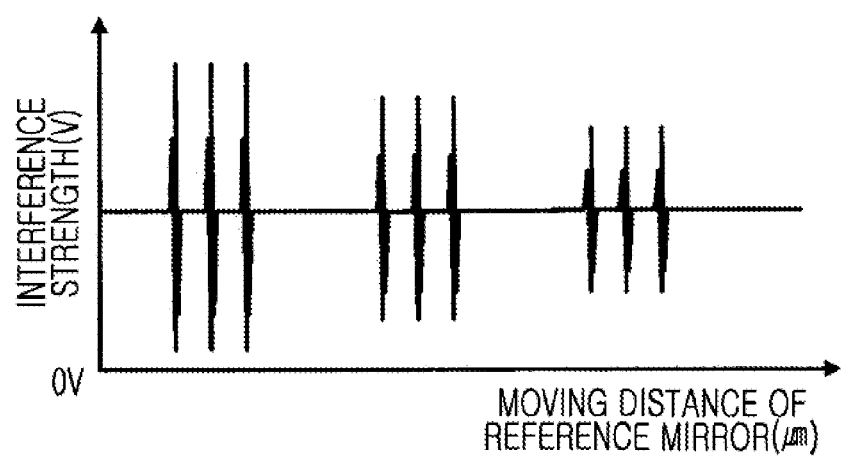
FIG. 8 is a graph showing an example of an interference waveform in the temperature measuring apparatus of FIG. 7.

FIG. 7 is a schematic view of a temperature measuring apparatus 100d according to another embodiment of the present invention. In the temperature measuring apparatus 100d of FIG. 7, an attenuator 171 is disposed in the middle of the reference light transmitting unit 170. As such, an intensity of a reference light may approach an intensity of the first to fourth measurement lights divided by the third light separating units 140 by disposing the attenuator 171 in the middle of the reference light transmitting unit 170. Accordingly, referring to waveforms of the graph of FIG. 8 (wherein a vertical axis is an interference strength (V) and a horizontal axis is a moving distance (μm) of a reference mirror), an interference waveform may be enlarged as compared with the graph of FIG. 2 in which an attenuator is not formed in the temperature measuring apparatus 100, and thus temperature measurement may be performed with higher precision.

As described above, in the current embodiment, temperatures of objects to be measured that are provided in the plurality of processing chambers PC1 to PC6 may be simultaneously measured without converting measurement lights by using a multiplexer. Also, the reference light reflecting unit 150 for reflecting a reference light, which is a standard of temperature measurement, and the light path length changing unit 160 for moving the reference light reflecting unit 150 to change an light path length of the reference light may be commonly used, and thus generation of a machine difference may be prevented, thereby simplifying the manufacture of the temperature measuring apparatus.

According to the present invention, a temperature measuring apparatus and a temperature measuring method that may simultaneously measure temperatures of objects to be measured that are provided in a plurality of processing chambers can be provided.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A temperature measuring apparatus comprising:
   a light source;
   a first light separating unit which divides light from the light source into a plurality of measurement lights;
   a plurality of second light separating units which divide the measurement lights from the first light separating unit into measurement lights and reference lights;
   a plurality of third light separating units which further divide the measurement lights from the second light separating units into first to n-th measurement lights, wherein the number of third light separating units is the same as the number of second light separating units;
   a reference light reflecting unit which reflects the reference lights from the second light separating units;
   an light path length changing unit which changes light path lengths of the reference lights reflected by the reference light reflecting unit;
   a plurality of reference light transmitting units which transmit the reference lights from the second light separating units to an emission position of the reference light reflecting unit, wherein the number of reference light transmitting units is the same as the number of second light separating units;

first to n-th measurement light transmitting units which transmit the first to n-th measurement lights from the third light separating units to measurement light emission positions of measurement points of objects to be measured; and a plurality of photodetectors which measure interference between the first to n-th measurement lights reflected by the objects to be measured and the reference lights reflected by the reference light reflecting unit, wherein the number of photodetectors is the same as the number of second light separating units, wherein the light path lengths of the first to n-th measurement lights between the third light separating units and the objects to be measured are differently set, and light path lengths of the reference lights reflected by the reference light reflecting unit are changed by the single light path length changing unit.

2. The temperature measuring apparatus of claim 1, wherein the reference light reflecting unit is formed of a single plane mirror.

3. The temperature measuring apparatus of claim 1, wherein the first light separating unit divides the light from the light source into the plurality of measurement lights having different wavelengths.

4. The temperature measuring apparatus of claim 1, further comprising an AC component extracting unit which extracts an AC component from an output signal applied from the photodetector.

5. The temperature measuring apparatus of claim 1, further comprising an optical attenuator which attenuates an intensity of the reference lights reflected by the reference light reflecting unit to be close to an intensity of the first to n-th measurement lights reflected by the objects to be measured.

6. A temperature measuring method for measuring temperatures of objects to be measured by using a temperature measuring apparatus comprising:

a light source;

a first light separating unit which divides light from the light source into a plurality of measurement lights;

a plurality of second light separating units which divide the measurement lights from the first light separating unit into measurement lights and reference lights;

a plurality of third light separating units which further divide the measurement lights from the second light separating units into first to n-th measurement lights, wherein the number of third light separating units is the same as the number of second light separating units;

a reference light reflecting unit which reflects the reference lights from the second light separating units;

an light path length changing unit which changes light path lengths of the reference lights reflected by the reference light reflecting unit;

a plurality of reference light transmitting units which transmit the reference lights from the second light separating units to an emission position of the reference light reflecting unit, wherein the number of reference light transmitting units is the same as the number of second light separating units;

first to n-th measurement light transmitting units which transmit the first to n-th measurement lights from the third light separating units to measurement light emission positions of measurement points of objects to be measured; and a plurality of photodetectors which measure interference between the first to n-th measurement lights reflected by the objects to be measured and the reference lights reflected by the reference light reflecting unit, wherein the number of photodetectors is the same as the number of second light separating units, wherein the light path lengths of the first to n-th measurement lights between the third light separating units and the objects to be measured are differently set, and light path lengths of the reference lights reflected by the reference light reflecting unit are changed by the single light path length changing unit.

* * * * *